United States Patent
Kim et al.

(10) Patent No.: US 7,660,084 B2
(45) Date of Patent: Feb. 9, 2010

(54) ELECTRIC ENERGY STORAGE DEVICE AND METHOD OF CHARGING AND DISCHARGING THE SAME

(75) Inventors: Sung-Min Kim, Yongin-si (KR); Hee-Young Lee, Anyang-si (KR); Yong-Ho Jung, Suwon-si (KR); Heui-Soo Kim, Seoul (KR); Sung-Chul Park, Seoul (KR); Ha-Young Lee, Suwon-si (KR); Eun-Sil Kim, Suwon-si (KR)

(73) Assignee: Ness Cap Co., Ltd., Suwon-si (KR)

( * ) Notice: Subject to any disclaimer, the term of this patent is extended or adjusted under 35 U.S.C. 154(b) by 524 days.

(21) Appl. No.: 10/540,919

(22) PCT Filed: Dec. 13, 2003

(86) PCT No.: PCT/KR03/02744

§ 371 (c)(1),
(2), (4) Date: Apr. 24, 2007

(87) PCT Pub. No.: WO2004/059815

PCT Pub. Date: Jul. 15, 2004

(65) Prior Publication Data

US 2008/0013224 A1    Jan. 17, 2008

(30) Foreign Application Priority Data

Dec. 30, 2002    (KR)    .................... 10-2002-0086299

(51) Int. Cl.
*H02H 3/20* (2006.01)

(52) U.S. Cl. ........................................ 361/16; 361/91.1
(58) Field of Classification Search .................. 361/16, 361/23, 91.1; 320/116, 118, 120
See application file for complete search history.

(56) References Cited

U.S. PATENT DOCUMENTS

| | | | | |
|---|---|---|---|---|
| 5,528,121 A | * | 6/1996 | Okamura | .................... 320/167 |
| 5,982,050 A | * | 11/1999 | Matsui | ...................... 307/10.7 |
| 6,323,608 B1 | * | 11/2001 | Ozawa | ....................... 318/139 |
| 6,861,767 B2 | * | 3/2005 | Amano et al. | .............. 307/10.1 |

FOREIGN PATENT DOCUMENTS

| | | | |
|---|---|---|---|
| JP | 06-105457 A | | 4/1994 |
| JP | 06-105458 A | | 4/1994 |
| JP | 10-108381 A | | 4/1998 |
| JP | 2002058176 A | * | 2/2002 |
| KR | 1998-024172 A | | 7/1998 |
| KR | 1998-028518 A | | 7/1998 |
| KR | 316313 B | | 2/2002 |

* cited by examiner

*Primary Examiner*—Danny Nguyen
(74) *Attorney, Agent, or Firm*—Sughrue Mion, PLLC (57) ABSTRACT

Disclosed are an electric energy storage device having a good cycle characteristic and a temperature characteristic and a method of charging and discharging the electric energy storage device. The electric energy storage device including a capacitor and a secondary battery combined in series is provided. When the capacitor of the electric energy storage device is an electric double layer capacitor, the capacitor is used to the voltage of 0V or less to increase an available energy usage.

10 Claims, 9 Drawing Sheets

ELECTRIC ENERGY STORAGE DEVICE AND METHOD OF CHARGING AND DISCHARGING THE SAME

TECHNICAL FIELD

The present invention relates to an electric energy storage device and a method of charging and discharging the electric energy storage device. More particularly, the present invention relates to the electric energy storage device obtained by connecting in series two energy storage devices having different temperature characteristics, different cycle characteristics and so exhibiting different capacities and a method of charging and discharging the electric energy storage device.

BACKGROUND ART

A capacitor is a device for obtaining an electric capacitance and is a kind of an electric storage device along with a storage battery. Recently, the usage of an ultracapacitor (or a supercapacitor) such as a metal oxide pseudo-capacitor, a hybrid-capacitor obtained by combining a storage battery and an electric double layer capacitor, is spread as an electric power source for an industrial field such as an electric automobile, a hybrid automobile, an electric power source for the solar energy, an uninterruptible power supply (UPS), and the like.

The ultracapacitor is an electric energy storage device for storing an electric energy within active carbon or metal oxide by means of a physical reaction or an electrochemical reaction having a rapid reaction speed. The ultracapacitor has a better cycle characteristic and a better temperature characteristic when comparing with those of the conventional storage batteries.

Figure 1:
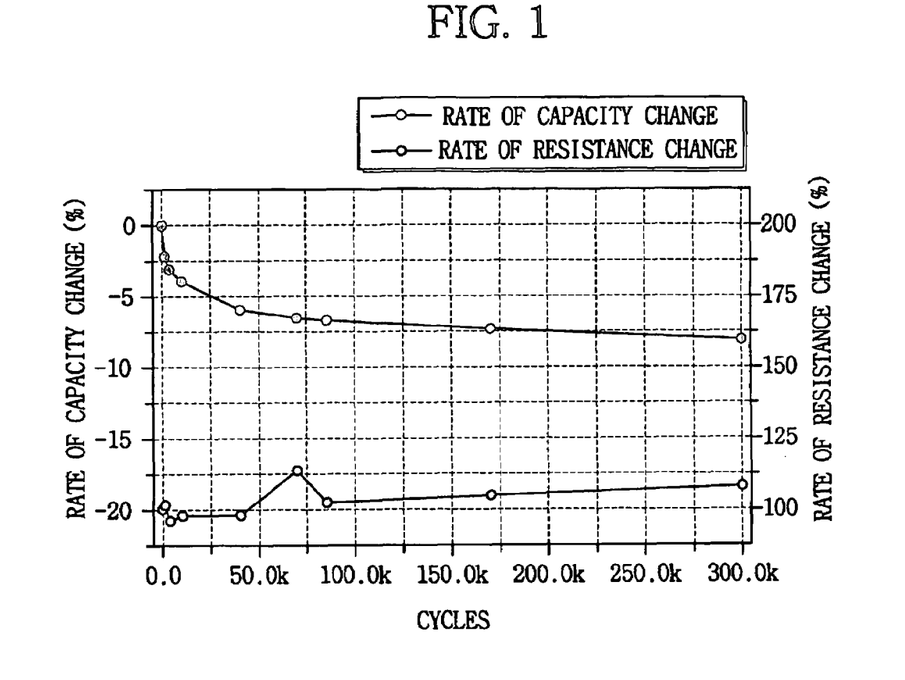
FIGS. 1 is a graph illustrating a cycle characteristic of an electric double layer capacitor.
Figure 2:
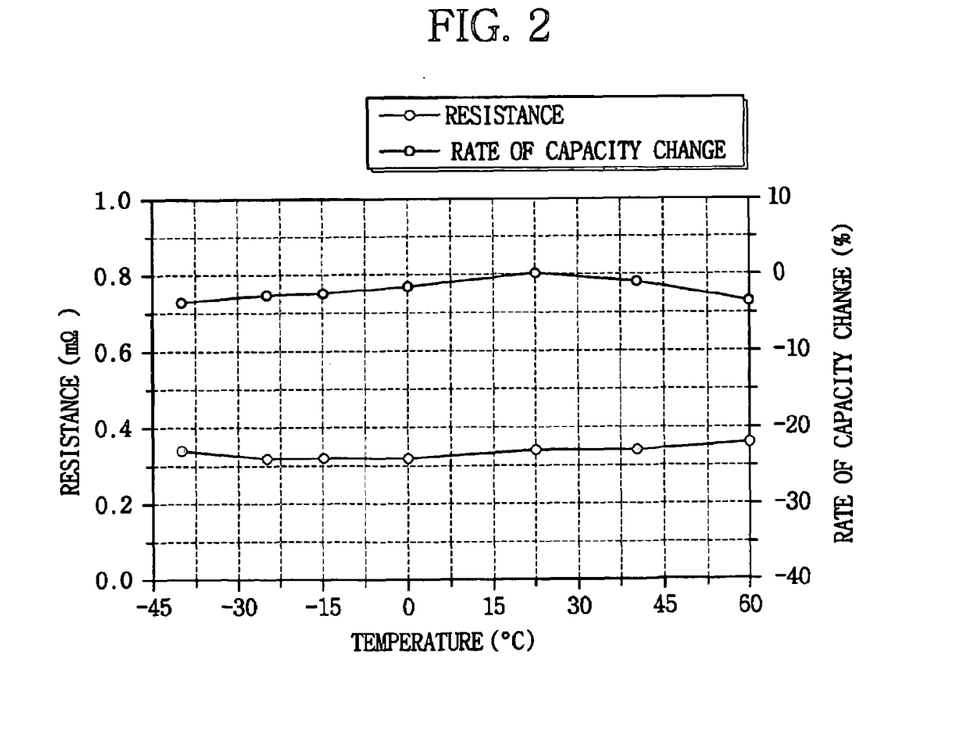
FIG. 2 is a graph illustrating a temperature characteristic of an electric double layer capacitor.

FIG. 1 is a graph illustrating a cycle characteristic of an electric double layer capacitor, which is one of an ultracapacitor and FIG. 2 is a graph illustrating a temperature characteristic of an electric double layer capacitor, which is one of an ultracapacitor. As concretely confirmed from FIGS. 1 & 2, the ultracapacitor has a cycle lifetime of about 100,000 times or over and so the ultracapacitor can be regarded as having almost permanent lifetime. In addition, the ultracapacitor has a good temperature characteristic within a wide temperature range of from about −45° C. to about 60° C. Therefore, this capacitor can be used as a starting device of an automobile engine at a low temperature.

However, the price of the ultracapacitor is about 20,000 won/Wh, while that of the lead acid battery is about 60 won/Wh. Therefore, even though the ultracapacitor has good characteristics, the spread of the ultracapacitor is slow. In contrast, since the lifetime of the storage battery is about 2-3 years, a large amount of keeping and repairing cost is required. In particular, the storage battery is widely used as the electric power source of the solar battery for the indicating light, especially used on a road or out in the fields until now. However, the application of the ultracapacitor is increasingly spread due to the excessive cost for keeping and repairing of the storage battery.

In the meantime, researches on an ultracapacitor having an improved energy density, a prolonged cycle lifetime and a low manufacturing cost are actively executed. For example, a hybrid capacitor including one electrode formed by using active carbon as an active material, which is generally used for the manufacture of the electric double layer capacitor and including the other electrode formed by using lithium intercalated graphite, which is generally used for a lithium ion battery or by using a material having a large capacitance such as $Li_4Ti_5O_2$, has been developed. Through the hybrid capacitor, the capacitance efficiency of the active carbon is increased and a charging/discharging depth of a secondary battery during charging/discharging is decreased. In addition, the problem concerning the cycle lifetime, which is a disadvantage of the secondary battery can be solved. However, obtaining a satisfactory result concerning both characteristics of the capacitor and the secondary battery using one electrolyte is not an easy task.

Generally, the secondary battery is inexpensive and has a high energy density when considering the capacitance thereof. However, the characteristic change according to the temperature is large because an electro-chemical reaction is utilized for storing electric energy. In addition, since the electrode becomes deteriorated according to the progress of the charging/discharging cycle, the cycle lifetime is relatively short. This will be described referring to FIG. 3.

Figure 3:
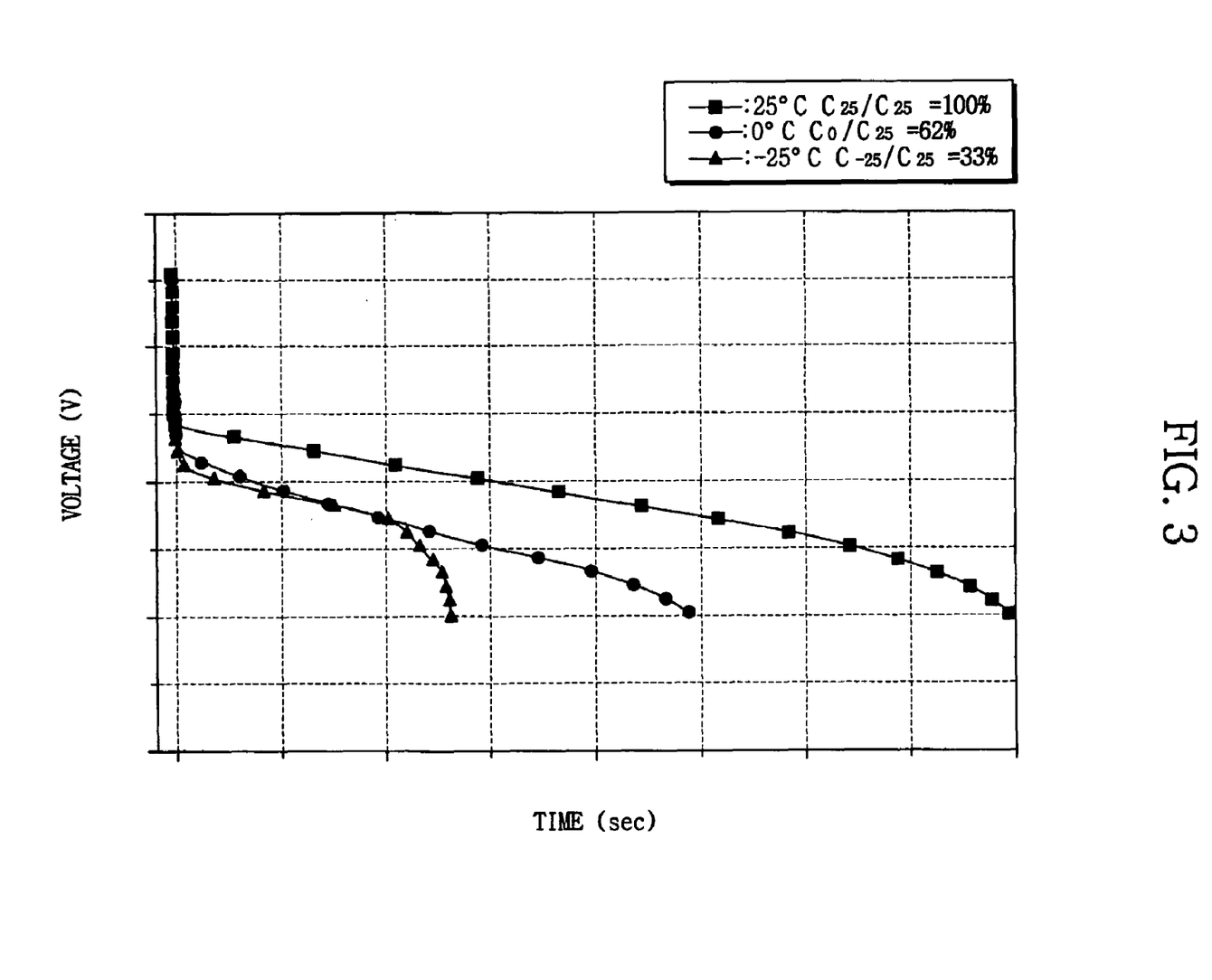
FIG. 3 is a graph illustrating a temperature characteristic of a lead acid battery.

FIG. 3 is a graph illustrating a temperature characteristic of a lead acid battery. As illustrated in FIG. 3, the most widely used secondary battery, the lead acid battery exhibits only 62% of the capacity at 0° C. and 33% of the capacity at −25° C. with reference to the capacity at 25° C. Accordingly, the secondary battery including the lead acid battery has an inferior temperature characteristic, particularly an inferior low temperature characteristic and has a cycle lifetime of about no more than 300 cycles.

When the lead acid battery is employed for an automobile, the starting of the automobile at a low temperature of subzero temperature frequently fails due to the bad low temperature characteristic. When the lead acid battery is employed for the solar system, a problem concerning the operation of a system including the lead acid battery is generated due to the lowering of the capacity and the deterioration of the charging performance. When the lead acid battery is employed for the solar system, a large lead acid battery having a large capacity can be used to solve the above-described problem. Then, the operating time of the system can be prolonged under the circumstance of an incomplete charging. However, the charging performance at a low temperature is further deteriorated after discharging because the capacity is large. This phenomenon is not limited to the lead acid battery but is a general characteristic of the secondary battery.

In order to solve this problem, a new system obtained by combining a capacitor and a secondary battery in parallel is widely used. In this system, the lifetime can be increased and the power characteristic can be improved by lightening the load of the secondary battery by utilizing the good power characteristic of the capacitor by entrusting the peak power to the capacitor.

According to this system, the lifetime of the secondary battery can be increased and the power characteristic can be improved. However, the cost is not reduced when considering the capacity. In addition, when the electric energy storage devices including the secondary battery and the capacitor are connected in series, generally, the same type of secondary battery or capacitor having similar capacities are used for reducing the voltage deviation between cells.

DISCLOSURE OF THE INVENTION

Accordingly, it is an object of the present invention is to provide an electric energy storage device, which is cheap when considering the capacity and has a good cycle characteristic and temperature characteristic.

Another object of the present invention is to provide a method of charging and discharging an electric energy storage device, by which the capacitance of the energy storage device can be used to the utmost.

To accomplish the object, there is provided in the present invention an electric energy storage device including a first electric energy storage device such as a capacitor and a second electric energy storage device such as a secondary battery combined in series.

Here, the electric capacity of the second electric energy storage device is preferably about 4-100 times of the electric capacity of the first electric energy storage device.

The secondary battery can be one of a lead acid battery, a nickel-cadmium (Ni—Cd) battery, a nickel-metal hydride battery and a lithium ion battery, and the capacitor can be one of an electric double layer capacitor, a metal oxide pseudo capacitor and a hybrid capacitor.

An over-voltage preventing device connected to both end portions of the capacitor and an over-discharge preventing device connected to both end portions of the secondary battery can be further provided.

As for the over-voltage preventing device, a Zener diode, a shunt regulator, an over-voltage preventing circuit including a voltage comparator for comparing a predetermined voltage and an applied voltage, a switch for flowing electricity when the applied voltage exceeds the predetermined voltage and a breeder resistor for discharging the capacitor when the switch flows the electricity, and the like can be used.

In order to accomplish the second object of the present invention, there also is provided in the present invention a method of charging and discharging of an electric energy storage device including a first electric energy storage device such as a capacitor and a second electric energy storage device such as a secondary battery connected to the capacitor in series is provided. Here, the capacitor is discharged to 0V or less.

The capacitor can be an electric double layer capacitor and the secondary battery can be one of a lead acid battery, a nickel-cadmium (Ni—Cd) battery, a nickel-metal hydride battery and a lithium ion battery

BRIEF DESCRIPTION OF THE DRAWINGS

The above objects and advantages of the present invention will become more apparent by describing preferred embodiments in detail with reference to the attached drawings in which.

BEST MODE FOR CARRYING OUT THE INVENTION

The present will be described in detail with reference to the attached drawings below.

Figure 4:
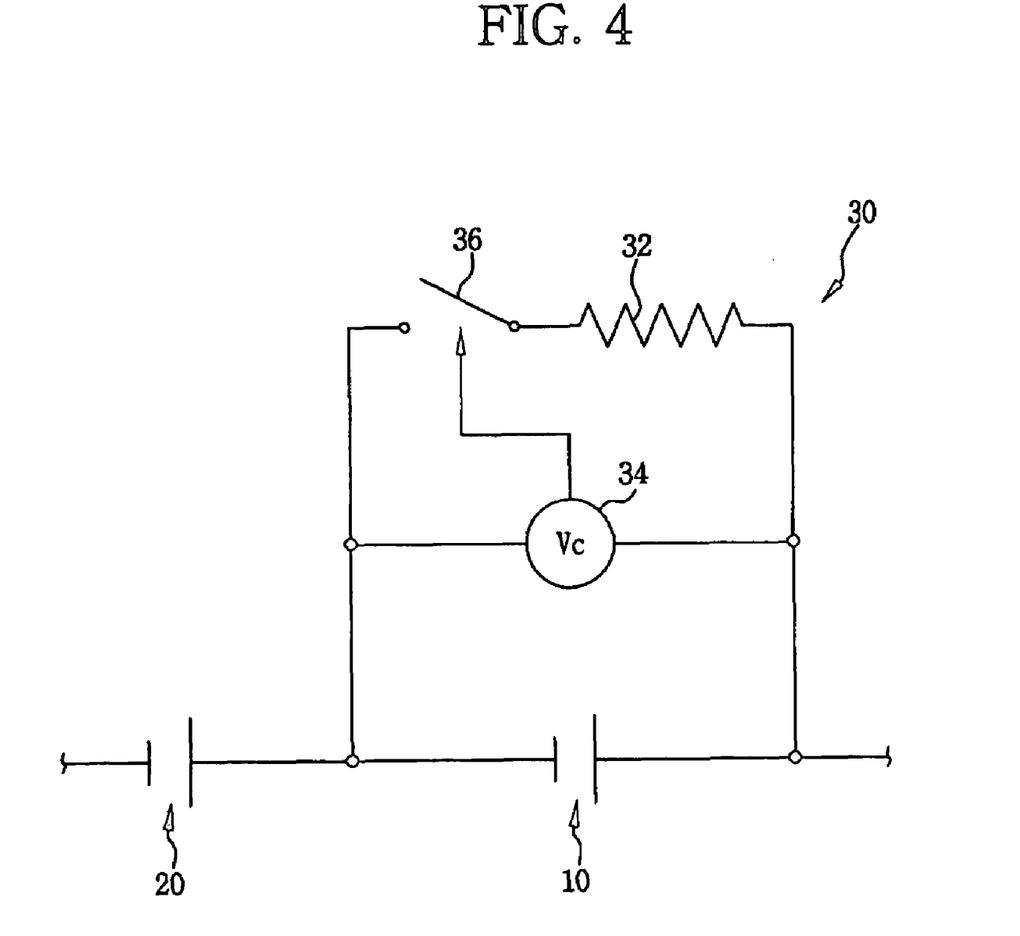
FIG. 4 is a constituting diagram illustrating an electric energy storage system according to a preferred embodiment of the present invention.

FIG. 4 is a constituting diagram illustrating an electric energy storage system according to a preferred embodiment of the present invention.

Referring to FIG. 4, the present invention includes a first electric energy storage device 10. The first electric energy storage device 10 can include a secondary battery or a capacitor, and has a better cycle characteristic or temperature characteristic while having a smaller electric capacity than subsequently described second electric energy storage device 20.

When the secondary battery including the lead acid battery, the nickel-cadmium battery, the nickel-metal hydride battery, the lithium ion battery and the like, is used as for the second electric energy storage device 20, the first electric energy storage device 10 including the ultracapacitor such as the electric double layer capacitor, the metal oxide pseudo-capacitor, the hybrid capacitor, and the like, can be used. The first electric energy storage device 10 generally has a better temperature characteristic and cycle characteristic than the second electric energy storage device.

In addition, the device also can be manufactured by connecting secondary batteries, or capacitors only if the temperature characteristic and the cycle characteristic of the first electric energy storage device 10 are better and the capacity is smaller than those of the second electric energy storage device 20.

The electric energy storage device according to the present invention includes the first electric energy storage device 10 and the second electric energy storage device 20, connected in series. The second electric energy storage device 20 can include a secondary battery such as the lead acid battery, the nickel-cadmium battery, the nickel-metal hydride battery, the lithium ion battery, and the like and an ultracapacitor such as the electric double layer capacitor, the metal oxide pseudo capacitor, the hybrid capacitor, and the like.

At this time, it is preferred that the capacity of the second electric energy storage device 20 is about 4-100 times of that of the first electric energy storage device. The cost of the second electric energy storage device is preferably lower than the first electric energy storage device 10 even though the temperature characteristic or the cycle characteristic of the second electric energy storage device 20 is inferior to that of the first electric energy storage device 10. However, the voltage deviation problem can be advantageously solved and the temperature characteristic and the cycle characteristic can be improved according to the present invention, by connecting the electric energy storage devices having a large electric capacity difference in series. Further, the electric energy storage device according to the present invention is preferable from the view of the economic side. Here, the second electric energy storage device 20 having a larger capacity functions a voltage buffer.

Particularly, the operation of the electric energy storage device according to the present invention will be described in detail.

When n numbers of capacitors are connected in series, generally, the capacitance can be calculated by the following equation 1.

$$\frac{1}{C} = \sum_{k=1}^{n} \frac{1}{C_k} \quad \text{(equation 1)}$$

In the equation 1, C represents the capacitance of the capacitor.

At this time, when the capacitors connected in series are charged, the applied voltage for each capacitor can be obtained by the following equation 2. Here, the voltage is inversely proportional to the capacitance of the capacitor.

$$V = \frac{i \times t}{C} \quad \text{(equation 2)}$$

In the equation 2, i represents current, t represents time and C represents the capacitance of the capacitor.

For example, when a capacitor having a capacitance of 1F and a capacitor having a capacitance of 10F are connected in series and then are charged, the voltage of 10V is applied to the capacitor having the capacitance of 1F and the voltage of 1v is applied to the capacitor having the capacitance of 10F, thereby giving a total capacitance of 0.91F. That is, when the capacitance difference between the capacitors connected in series is large, the total capacitance converges to the smaller value of the capacitance.

Generally, the same kinds of electric energy storage devices including a capacitor and a secondary battery, having the same capacity are connected in series in order to reduce the voltage deviation. However, electric energy storage devices having a large capacity difference can be advantageously connected in series.

For example, when the capacitors having a capacitance difference of 100 times are connected in series, 1% of the total applied voltage is applied to the capacitor having the capacitance of 100 times, while 99% of the total applied voltage is applied to the capacitor having the smaller capacitance. Therefore, the voltage deviation problem can be rather advantageously solved.

From the viewpoint of the temperature characteristic, when the capacitors having such a large difference in capacitances are connected as the first electric energy storage device 10 and the second electric energy storage device 20, in series, the temperature characteristic is expected to improve.

For example, a capacitor having the same capacitance of 1F at −25° C. and at room temperature, and a capacitor having a capacitance of 10F at room temperature and 30% of this capacitance value at −25° C. are connected in series, the total capacitance at room temperature becomes 0.91F and the total capacitance at −25° C. becomes 0.75F. Therefore, the capacitance deviation is 17.6%.

However, when a capacitor having the same capacitance of 1F at −25° C. and at room temperature, that is, having a good temperature characteristic is set as the first electric energy storage device 10, and a capacitor having a capacitance of 100F at the room temperature and 30% of the capacitance value at −25° C., that is, having an inferior temperature characteristic, is set as the second electric energy storage device 20, and when the two capacitors are connected in series, the total capacitance at room temperature is about 0.99F and the total capacitance at −25° C. is about 0.97F. Therefore, the capacitance deviation is only 2%.

That is, when a capacitor having an inferior temperature characteristic and a capacitor having a better temperature characteristic are connected in series, the temperature characteristic can be improved when the capacitance of the capacitor having the inferior temperature characteristic is increased.

From the viewpoint of the cycle characteristic, the electric energy storage device according to the present invention will be described below.

For example, when a capacitor having a capacitance of 1F and a capacitance decreasing ratio of 5% after 10,000 cycles and a capacitor having a capacitance of 10F and a capacitance decreasing ratio of 50% after 10,000 cycles, are connected in series, an initial capacitance is 0.91F and the capacitance after 10,000 cycles is 0.8F. Therefore, the capacitance decrease is about 12.1%.

However, when a capacitor having a good cycle characteristic, a capacitance of 1F and a capacitance decreasing ratio of 5% after 10,000 cycles is set to the first electric energy storage device 10 and a capacitor having an inferior cycle characteristic, a capacitance of 100F and a capacitance decreasing ratio of 50% after 10,000 cycles is set to the second electric energy storage device 20, and when the first and the second electric energy storage devices 10 and 20 are connected in series, an initial capacitance is 0.99F and the capacitance after 10,000 cycles is 0.93F. Therefore, the capacitance decrease is only about 6.5% and an improved effect of the cycle characteristic is expected.

Meantime, when the capacitance difference becomes large, the voltage change of the second electric energy storage device 20 having a large capacitance and a shorter cycle lifetime becomes small. Therefore, the charging/discharging depth becomes smaller and the capacitance decreasing ratio becomes even smaller. That is, the second electric energy storage device 20 having the large capacitance functions a buffer (booster). This effect is obtainable for a system obtained by connecting a capacitor and a secondary battery, or by connecting different kinds of secondary batteries in series as well as the system obtained by connecting between capacitors in series.

For example, the voltage change during charging/discharging with constant current is linear for the capacitor. However, in case of the secondary battery, the voltage changing ratio around a nominal voltage is small, while the voltage changing ratio above and below the nominal voltage is large. Therefore, the voltage change is not linear. When the secondary battery having the large capacity is set to the second electric energy storage device 20 and the capacitor having the small capacity is set to the first electric energy storage device 10, and when these two devices 10 and 20 are connected in series, the secondary battery functions the voltage buffer illustrating little voltage change.

From the viewpoint of the cost, the cycle lifetime and the temperature characteristic are improved by employing the electric energy storage device as described above. In addition, the total voltage can be increased by employing the electric energy storage device as the voltage buffer. This electric energy storage device is cheap and has a large capacity. This will lower the cost of the electric energy storage device when considering the energy.

Generally, when capacitors having the same capacitances are connected in series, the voltage increases, however, the capacitance decreases in inversely proportional to the number of the capacitors connected in series. That is, when two capacitors having the same capacitances are connected in series, the voltage is increased by two times while the capacitance is decreased to half.

However, according to the electric energy storage device obtained by connecting in series an electric energy storage device having a large capacity and an electric energy storage device having a small capacity by the present invention, the total capacity is near the capacity of the electric energy storage device having the smaller capacity, as known from the calculated result using the capacitors described above. That is, the capacity efficiency of the first electric energy storage device 10 having the smaller capacity can be increased. Further, when the first electric energy storage device is expensive, the system according to the present invention is economic.

The electric energy storage device described above also has a rapid charging/discharging speed. One of the general defects of the secondary battery is a slow charging speed accompanied during using an electro-chemical reaction for storing an electric energy. In particular, the charging speed at a low temperature is even slower when comparing with that at room temperature.

In case of a lead acid battery, 8 hours or more is required for the charging. When charging current is increased for a rapid charging, the lifetime thereof is decreased. However, the electric double layer capacitor among the ultracapacitor, illustrates a rapid charging/discharging speed and a high power characteristic because an electric energy is physically stored in an electrode. The electric energy storage device manufactured by the above-described method illustrates a rapid charging/discharging speed because most of the characteristics of this electric energy storage device are similar to those of the ultracapacitor.

When the first electric energy storage device and the second electric energy storage device are connected in series, the capacity of the second electric energy storage device should be at least 4 times or over than that of the first electric energy storage device in order to obtain 80% or more of the capacity of the electric energy storage device having a higher capacity. However, even when the capacity of the first electric energy storage device is ¼ times or over than that of the second electric energy storage device, the result might be the same if the less amount range of the ¼ times of the capacity is utilized.

In addition, as illustrated by the above-described calculating method, the performance improving effect is increased when the capacity of the second electric energy storage device is larger than that of the first electric energy storage device. However, when the capacity of the second electric energy storage device is 100 times than that of the first electric energy storage device, 99% of the capacity of the first electric energy storage device can be utilized. When the capacity of the second electric energy storage device exceeds 100 times of that of the first electric energy storage device, the capacitance increasing efficiency becomes insignificant.

Therefore, the 100 times of the difference between the capacity is sufficient. At this time, the capacity ratio of the two storage devices can be changed according to the required conditions considering the applied field.

The operation of each type will be described in detail below referring to preferred embodiments.

An amount of electric energy E storable in a capacitor is proportional to the capacitance C of the capacitor and is proportional to the square times of the voltage V, as illustrated by the following equation 3.

$$E = \frac{1}{2}CV^2 \quad \text{(equation 3)}$$

For example, electric energy storable in an ultracapacitor having a operating voltage of 2.7V and a capacitance of 5000F (3.75 Ah/5.06 Wh), is 18225J. When this ultracapacitor is set as the first electric energy storage device 10 and a lead acid battery having a voltage of 12V and a capacity of 65 Ah (780 Wh) is set to the second electric energy storage device 20, and these two devices are connected in series, the total capacity is 94.5% of the capacity of the ultracapacitor, that is, 3.545 Ah, and the capacity of the lead acid battery becomes 17.3 times of the capacity of the ultracapacitor. Therefore, the voltage of the lead acid battery during charging/discharging is not much changed. Most of the voltage change is exhibited by the ultracapacitor.

Accordingly, even though the capacitor and the storage battery are connected in series, the total charging/discharging characteristic is illustrated as that of the capacitor and this system functions a capacitor having a total capacitance of 94.5% of the capacitance of the ultracapacitor, that is, 4727F. The ultracapacitor and the lead acid battery are connected in series and thus obtained system is charged to the sum of the voltage of the lead acid battery 12V and the operating voltage of the ultracapacitor 2.7V, that is, 14.7V. After that, this system is discharged to 12V to obtain a capacitor having an operating voltage of 14.7V and a capacitance of 4727F.

Therefore, the above-described electric energy storage device obtained by connecting two devices in series, is an electric energy storage device having a capacitance of 4727F and an available voltage range of 12.0-14.7V The electric energy discharged in the voltage range of 12.0-14.7V is 170,385J (47.3 Wh) according to the equation 3.

That is, the system obtained by connecting the lead acid battery and the ultracapacitor in series according to the present invention produces 9.4 times of the electric energy when comparing with the case employing the ultracapacitor alone.

When 5 ultracapacitors having an operating voltage of 2.7V and a capacitance of 5000F are connected in series, the total operating voltage is 13.5V and the total capacitance is 1000F. When considering this result, a system obtained by connecting the lead acid battery and the ultracapacitor in series is more effective.

When an electric energy storage device is manufactured by connecting the ultracapacitor and the lead acid battery in series, as described above, 15% of the cost is required when comparing with the cost of manufacturing an electric energy storage device having a capacitance of 50 Wh by using only the ultracapacitors.

When considering the ultracapacitor, since the cheap lead acid battery having a large capacity is connected in series to the ultracapacitor, the operating voltage range is increased by 12V from 2.7-0V to 14.7-12.0V. At this time, the lead acid battery functions a voltage buffer.

Of course, an electric energy storage device manufactured by using only lead acid batteries is cheaper than the electric energy storage device manufactured by using the ultracapacitor and the lead acid battery. However, the cycle lifetime and the low temperature characteristic of the electric energy storage device including the ultracapacitor and the lead acid battery are improved when comparing with the device including only the lead acid battery. Therefore, a smooth operation of the system irrespective of temperature is ensured and the lifetime of the electric energy storage device is prolonged.

At last, the cost for keeping and repairing can be reduced. In particular, when the electric energy storage device is installed out in the fields including on a road, at the sea and in the mountain, the cost for keeping and repairing is even higher than that of the lead acid battery.

Figure 9:
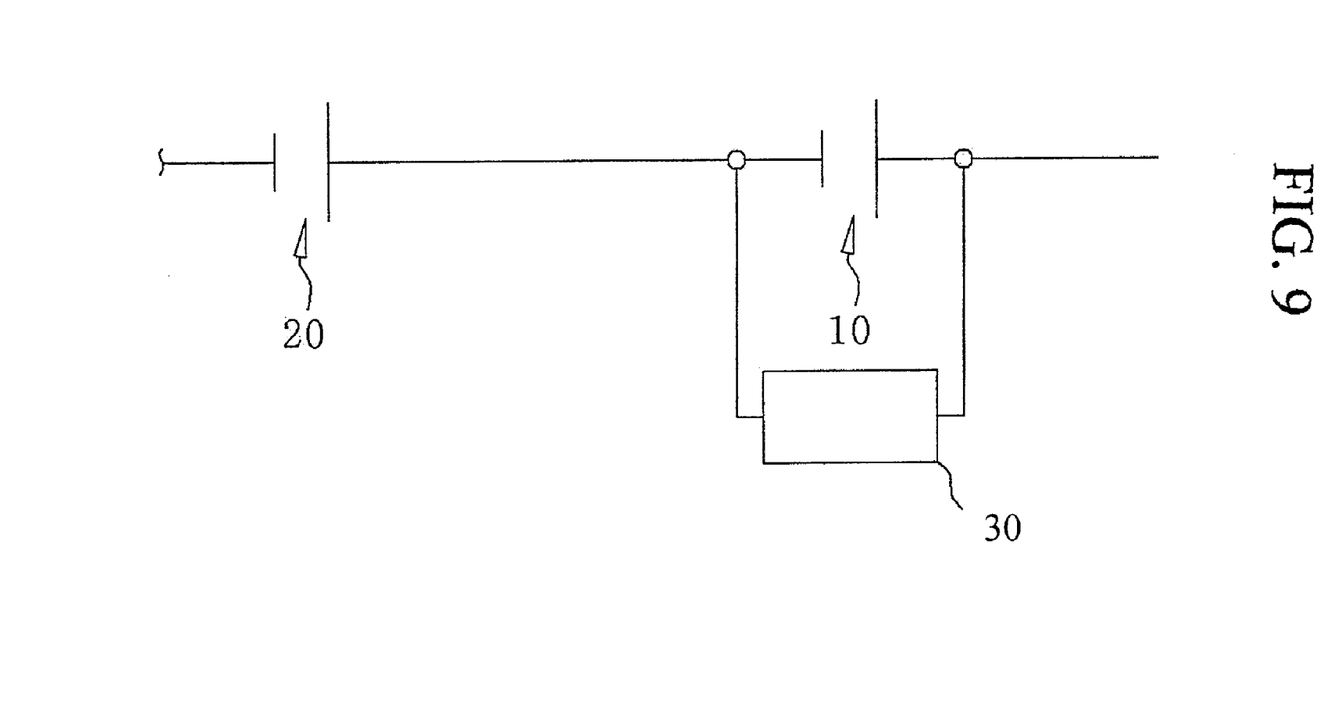
FIGS. 9 and 10 are diagrams illustrating an electric energy storage device comprising an over-voltage preventing device according to other exemplary embodiments.
Figure 10:
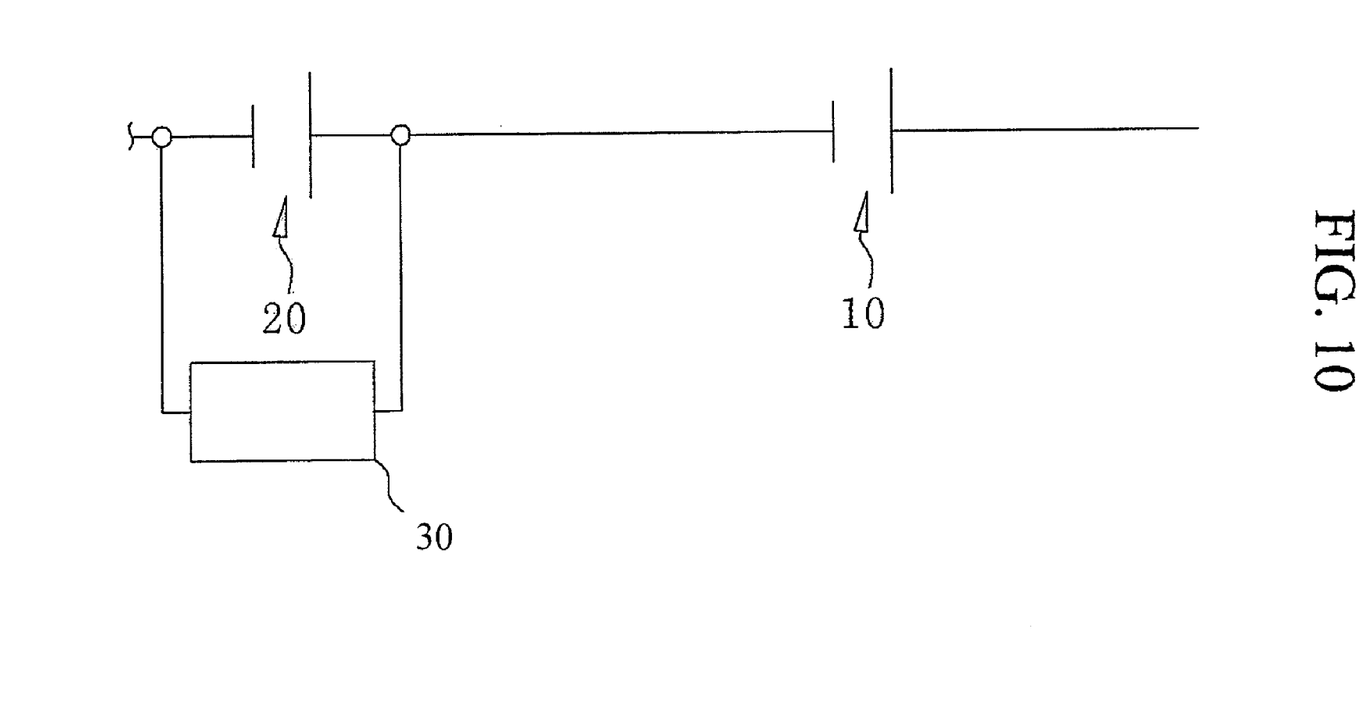

The electric energy storage device according to the present invention may further include an over-voltage preventing device 30 connected to both end portions of the first electric energy storage device 10 and may further include an over-discharge preventing device at both end portions of the second electric energy storage device 20 as shown in FIGS. 9 and 10.

As for the over-voltage preventing device, a Zener diode may be connected to the reverse direction to both end portions of the first electric energy storage device or a shunt regulator may be connected to the first electric energy storage device.

Otherwise, as illustrated in FIG. 4, an over-voltage preventing circuit including a voltage comparator 34 for comparing a predetermined voltage with an applied voltage, a switch 36 for flowing electricity when the applied voltage exceeds the predetermined voltage after comparing the voltage by means of the voltage comparator 34, and a breeder resistor 32 for discharging the first electric energy storage device when the switch is on for flowing the electricity, can be used.

A power module can be manufactured by connecting in series the first electric energy storage device 10 having a small capacity and the second electric energy storage device 20 having a large capacity. At this time, when the second electric energy storage device is the secondary battery, the voltage of the second electric energy storage device is gradually dropped due to the charging/discharging efficiency of less than 100% during self-discharging and charging/discharging process. When the charging voltage of the power module connected in series is kept constant, the voltage applied to the first electric energy storage device 10 may be increased during charging by the dropped voltage of the second electric energy storage device.

Due to this behavior, a voltage exceeding a operating voltage is applied to the first electric energy storage device 10, and this accelerates the deterioration of the electric energy storage device to shorten the lifetime thereof.

In addition, when the secondary battery is used and the voltage is kept within operating voltage range, relatively long lifetime can be obtained. However, when the secondary battery is over-discharged to the voltage below the operating voltage, the lifetime is shorten and when the situation goes from bad to worse, the function as the secondary battery might be lost.

Therefore, the lifetime of the power module obtained by connecting in series the first and the second electric energy storage device, can be increased through operating the first electric energy storage device 10 and the second electric energy storage device 20 within an appropriate voltage range.

In order to accomplish the increase of the lifetime, the secondary battery should be charged when the second electric energy storage device is the secondary battery and this battery is discharged to the voltage below a predetermined voltage. When the voltage exceeding a predetermined voltage is applied to the first electric energy storage device, the electric energy storage device having a smaller capacity should be discharged.

As for the over-voltage preventing device, the Zener diode is used. When an inverse voltage is applied to the Zener diode, the current is not flow until the voltage reaches to a breakdown voltage and then flows after reaching the breakdown voltage. When a Zener diode having the same breakdown voltage with the predetermined voltage of the first electric energy storage device, is used, the charging of the first electric energy storage device to the voltage above the predetermined voltage can be prevented.

The shunt regulator is used as a voltage supplying device to an electro magnetic apparatus. This shunt regulator can be used as the over-voltage preventing device because a current flows when an applied voltage exceeds a predetermined value.

Therefore, when the first electric energy storage device is connected to the input terminal of the shunt regulator, and when the first electric energy storage device is charged to a predetermined voltage or over, the current starts to flow and the first electric energy storage device is discharged to the voltage under the predetermined voltage.

In addition, the over-voltage preventing circuit 30 illustrated in FIG. 4, exhibits a similar function with the Zener diode or the shunt regulator when an applied voltage to the first electric energy storage device 10 exceeds the predetermined voltage, the voltage comparator 34 detects this over-voltage and the switch 36 connected to the breeder resistor in series flows current.

Then, the electric energy storage device is discharged through the breeder resistor 32. When the electric energy storage device is discharged below the predetermined voltage, the switch is shut to prevent the over-charging of the electric energy storage device so as not to exceed the predetermined voltage.

For example, a lead acid battery (2.5 Ah/2.0V) and an ultracapacitor (100F/ 2.7V/0.075 Ah) are connected in series and a passivating circuit having a operating voltage of 2.7V is attached to the ultracapacitor to constitute a power module. When this module is used in a voltage range of 2.2-4.7V and when the voltage of 4.7V is applied to the power module, the voltage of 2.7V or over is applied to the ultracapacitor when the lead acid battery is discharged to below 2.0V Then, the passivating circuit of the ultracapacitor operates and the ultracapacitor discharges to the voltage below 2.7V while the lead acid battery is charged to 2.0V or over. Therefore, both the lead acid battery and the ultracapacitor can be passivated.

Meantime, an over-discharge preventing device (not shown) can be attached to both end portions of the second electric energy storage device in order to operate the serially connected electric energy storage device appropriately. As described above, the over-discharge preventing device is provided to prevent the drop of the voltage of the second electric energy storage device to the voltage below the predetermined voltage due to the self-discharge and the charging/discharging efficiency of below 100%. When the voltage of the second electric energy storage device is discharged to the voltage below the predetermined voltage, the over-discharge preventing device charges again to the voltage above the predetermined voltage. Therefore, the same effect is obtainable by means of the over-discharge preventing device with the over-voltage preventing device 30.

Further, a method of charging and discharging an electric energy storage device is provided in the present invention. According to the method of charging and discharging the electric energy storage device, the electric energy storage device is charged to the sum of the operating voltage of the first electric energy storage device 10 and the nominal voltage of the second electric energy storage device. Then, the first electric energy storage device 10 is discharged to the voltage below 0V in the electric energy storage device.

Generally, the available voltage range of the ultracapacitor is from 0V to the rated voltage. However, the current increases by geometric progression according to the lowering of the voltage during discharging by (stationery electric) constant power. Therefore, practically available voltage range is from ½ of the rated voltage to the rated voltage. However, when the system is manufactured by connecting the ultracapacitor and the secondary battery in series, the ultracapacitor can be used to the voltage below 0V.

For example, when only ultracapacitor (100F/2.7V, 75 mAh) is used, practically availab voltage range is about 1.35-2.7V and available electric energy is $\frac{1}{2} \times 100 \times (2.7^2 - 1.35^2) = 273.4J$. However, when a power module manufactured by connecting the ultracapacitor (100F/2.7V) and the lithium ion secondary battery (3.7V, 1100 mAh) in series, is charged to 6.4V and then is discharged to 3.7V, the total capacitance is 93.6F and most of the voltage change is generated by the ultracapacitor. At this time, the discharged electric energy is $\frac{1}{2} \times 93.6 \times (6.4^2 - 3.7^2) = 1276J$.

Meantime, the discharged energy when charging the power module to 6.4V and then discharging to 3.0V according to the method of charging and discharging by the present invention, is $\frac{1}{2} \times 93.6 \times (6.4^2 - 3.0^2) = 1496J$. This energy is 5.5 times of that of the ultracapacitor. That is, as the operating voltage range of the ultracapacitor is widen, the operating voltage range of the total power module is widen. Through this, the available energy amount can be increased.

When the power module connected in series is discharged by 3W, a current of 0.47A flows at the initial discharging period of 6.4V, however, a current of 1A flows at the terminal discharging period of 3V.

When an ultracapacitor having a operating voltage of 2.7V is discharged by constant power of 3W from 2.7V to −0.7V, a current of 1.1A flows at the initial discharging period. However, as the voltage converges to 0V, the current increases to infinity. Therefore, this module cannot be operated around the voltage of 0V.

Another example is as follows. A power module is constituted by connecting a lead acid battery of 12V/65 Ah and an ultracapacitor of 5000F/2.7V, in series. The power module is charged to 14.7V and then is discharged to the nominal voltage of the lead acid battery of 12V Then, discharging energy is $\frac{1}{2} \times 472 \times (14.7^2 - 12^2) = 170,385J$ (47.3 Wh).

However, when the power module is charged to 14.7V and then is discharged to 9.3V, that is, when the ultracapacitor is used from 2.7V to −2.7V according to the method of charging and discharging of the present invention, the discharging energy is $\frac{1}{2} \times 4727 \times (14.7^2 - 9.3^2) = 306,310J$ (85 Wh). The discharging energy is 1.8 times of the discharging energy obtained when discharged to 12V. This result is not obtainable by using only the ultracapacitor. However, this result is obtainable by the present invention because the secondary battery connected to the ultracapacitor functions the voltage booster.

The first electric energy storage device preferably includes an electric double layer capacitor and the second electric energy storage device preferably includes a lead acid battery, a nickel-cadmium (Ni-Cd) battery, a nickel-metal hydride battery and a lithium ion battery. More preferably, the electric energy storage device for charging and discharging further includes the over-voltage preventing device or the over-discharge preventing device.

In order to enlarge the voltage window of the ultracapacitor by using an electric energy storage device having a small capacity to 0V or less in a power module having the ultracapacitor and the secondary battery connected in series, and electro-chemical stability during applying a reverse voltage to the ultracapacitor is an important point.

Therefore, the secondary battery using the electro-chemical reaction is not appropriate. Among the ultracapacitor, the electric double layer capacitor physically storing the electric energy is available.

The available range of the reverse voltage of the electric double layer capacitor now on production is −0.7~−1.0V. Therefore, the available operating voltage range of commercially available electric double layer capacitor is −1.0 ~2.7V.

Hereinafter, the preferred embodiments of the present invention will be described in more detail.

EXAMPLE 1

Manufacture of an Electric Energy Storage Device

An electric energy storage device was manufactured by connecting in series a lead acid battery having a capacity of 2.5 Ah and a nominal voltage of 2.0V with an electric double layer capacitor having a capacitance of 105.4F and a operating voltage of 2.7V.

Charging/Discharging Characteristic

Thus manufactured electric energy storage device was charged with a constant current of 3A to 4.7V which is the sum of the nominal voltage of the lead acid battery, 2.0V, with the operating voltage of the electric double layer capacitor, 2.7V, and then was charged at 4.7V for 30 minutes. Then, the device was discharged with constant current of 1A to 2.2V. The result is illustrated in FIG. 5.

Figure 5:
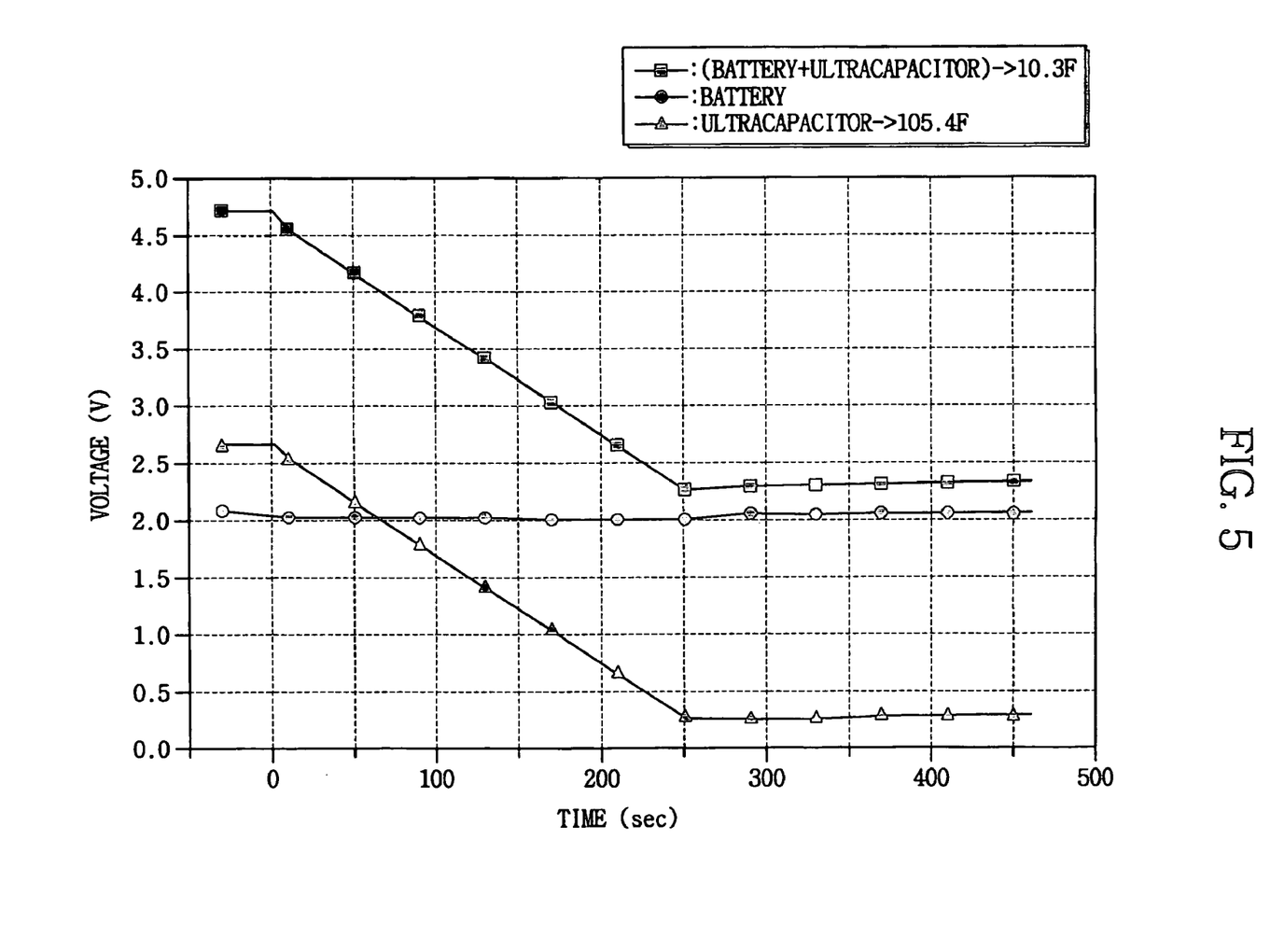
FIG. 5 is a graph illustrating a charging/discharging characteristic of an electric energy storage device according to a preferred embodiment of the present invention.

Referring to FIG. 5, the charging and discharging characteristic of thus manufactured electric energy storage device exhibited a linear characteristic as the capacitor because most of the voltage change during the charging and discharging occurred at the ultracapacitor and the voltage change of the lead acid battery is small.

In addition, the capacitance of the ultracapacitor was 105.4F, while the capacitance of the electric energy storage device manufactured by connecting in series the lead acid battery and the ultracapacitor was 102.3F. It is confirmed that this value is similar to the theoretically calculated value 102.2F by the equation (1). According to this result, the equation (1) is still applicable to the combined system of the capacitor and the secondary battery as well as the capacitor.

The capacitance of the used ultracapacitor is 105.4F, and the capacitance of the serially connected electric energy storage device is 102.3F. The difference of the capacitances is just 3%. Even though the capacitance is regarded as 100F for the convenience of the calculation, the effect of the present invention can be sufficiently proved. Therefore, the capacitance of the electric energy storage device obtained by connecting the ultracapacitor and the lead acid battery in series is set to 100F, hereinafter.

As illustrated in FIG. 5, the charging of thus manufactured electric energy storage device by 3A corresponds to 40C (1C; charging/discharging the electric energy storage device having a capacitance of X-Ah by X-A). From the viewpoint of the secondary battery, this value corresponds to a very high charging/discharging speed.

Electric Energy

The electric energy storable in the ultracapacitor (100F/2.7V) is $\frac{1}{2} \times 100 \times 2.7^2 = 364.5J$ (0.1 Wh). However, as the voltage during discharging with constant power decrease, current increases. Therefore, practically operating voltage is from the rated voltage to the half of the rated voltage. Accordingly, available electric energy is $\frac{1}{2} \times 100 \times (2.7^2 - 1.35^2) = 273.4J$ (0.076 Wh).

Meantime, the available electric energy of thus manufactured electric energy storage device within a voltage range of 2.2V-4.7V, was $\frac{1}{2} \times 100 \times (4.7^2 2.2^2) = 862.5J$ (0.24 Wh). This value is 3.2 times of the electric energy obtainable from only the ultracapacitor (100F/2.7V).

Temperature Characteristic

Thus manufactured electric energy storage device was charged with a constant current of 0.1A at 25° C., 0° C. and −25° C., respectively, to 4.7V, and then is charged at 4.7V for 1 hour. After that, the device was discharged with constant current of 0.1A to 2.2V. During the above-described procedure, the capacity at each temperature was measured and illustrated in FIG. 6.

Figure 6:
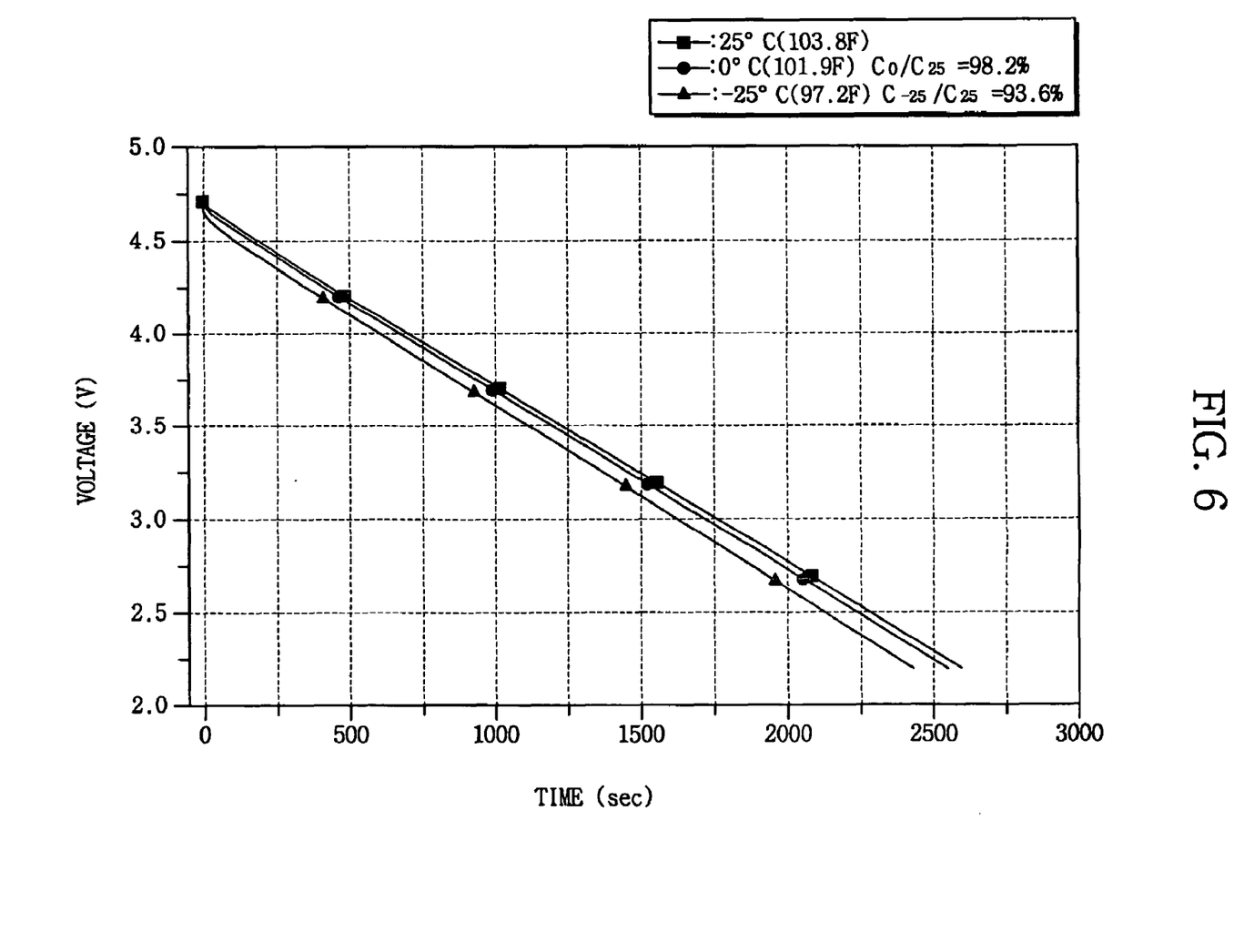
FIG. 6 is a graph illustrating a temperature characteristic of an energy storage device in FIG. 5.

Referring to FIG. 6, the capacitance change at 25° C., 0° C. and −25° C. was, respectively, 103.8F, 101.9F and 97.2F. Based on these values, the capacitance at −25° C., was calculated as 93.6% of the capacitance at 25° C. Therefore, the capacitance deviation was only 6.4%.

That is, the electric energy storage device obtained by combining the lead acid battery having an inferior temperature characteristic and a large capacity and the electric double layer capacitor having a good temperature characteristic and a relatively small capacity in series, exhibited an insignificant change of characteristics according to the temperature, as confirmed theoretically.

Cycle Characteristic

Thus manufactured electric energy storage device was charged with constant current of 3A (40C) to 4.7V, and charged at 4.7V for 1 minute. Then, the device was discharged with constant current of 3A (40C) to 2.2V and then rest for 1 minute. The above-described procedure cycle was regarded as 1 cycle and the cycle was continuously executed. Thus obtained result is illustrated in FIG. 7.

Figure 7:
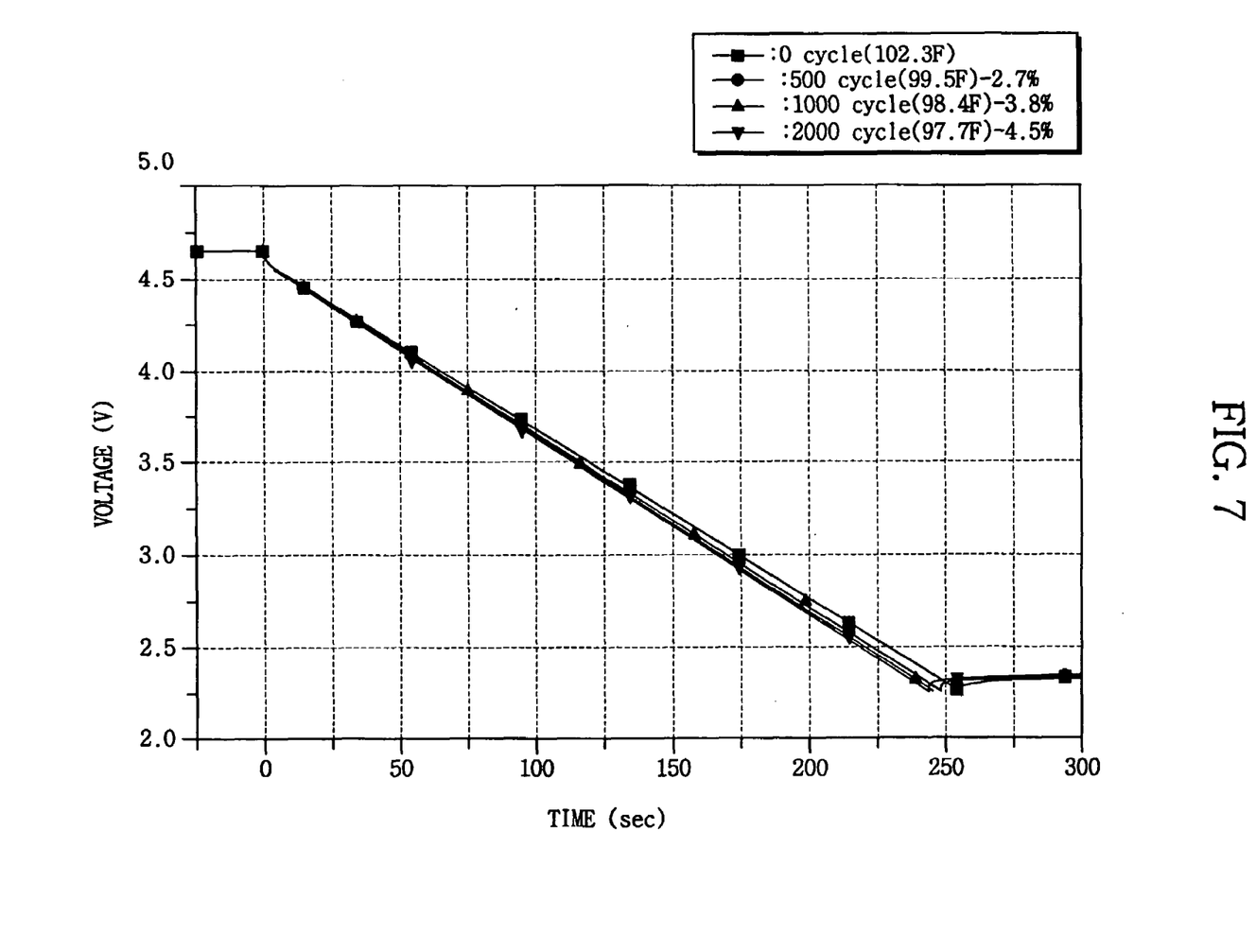
FIG. 7 is a graph illustrating a cycle characteristic of an energy storage device in FIG. 5.

Referring to FIG. 7, the capacitance decrease according to the cycle will be discussed. The capacitance was 102.3F at the initial time, 99.5F after 500 cycles, 98.4F after 1000 cycles and 97.7F after 2000 cycles.

The capacitances could be illustrated by percent of the initial capacitance, as 97.3% after 500 cycles, 96.2% after 1000 cycles and 95.5% after 2000 cycles.

That is, the capacitance decrease after applying 2000 cycles was just 4.5% of the initial value. Therefore, the electric energy storage device obtained by connecting the ultracapacitor having a good cycle lifetime and a small capacity with the lead acid battery having an inferior cycle lifetime and a relatively large capacity in series had an improved cycle lifetime as confirmed by this experiment and as known theoretically.

EXAMPLE 2

Manufacture of an Electric Energy Storage Device

A power module was manufactured by connecting a lithium ion secondary battery having a nominal voltage of 3.7V and a capacity of 1100 mAh and an electric double layer capacitor of 100F/2.7V, in series.

Charging/Discharging Experiment

Thus manufactured electric energy storage device was charged with constant current of 1A to 6.4V, which was the sum of the nominal voltage of 3.7V of the lithium ion secondary battery and the operating voltage of 2.7V of the ultracapacitor, and then was charged at 6.4V for 30 minutes. After then, the device was discharged with constant current of 0.1A to 3.0V. The voltage change according to time is illustrated in FIG. 8.

Figure 8:
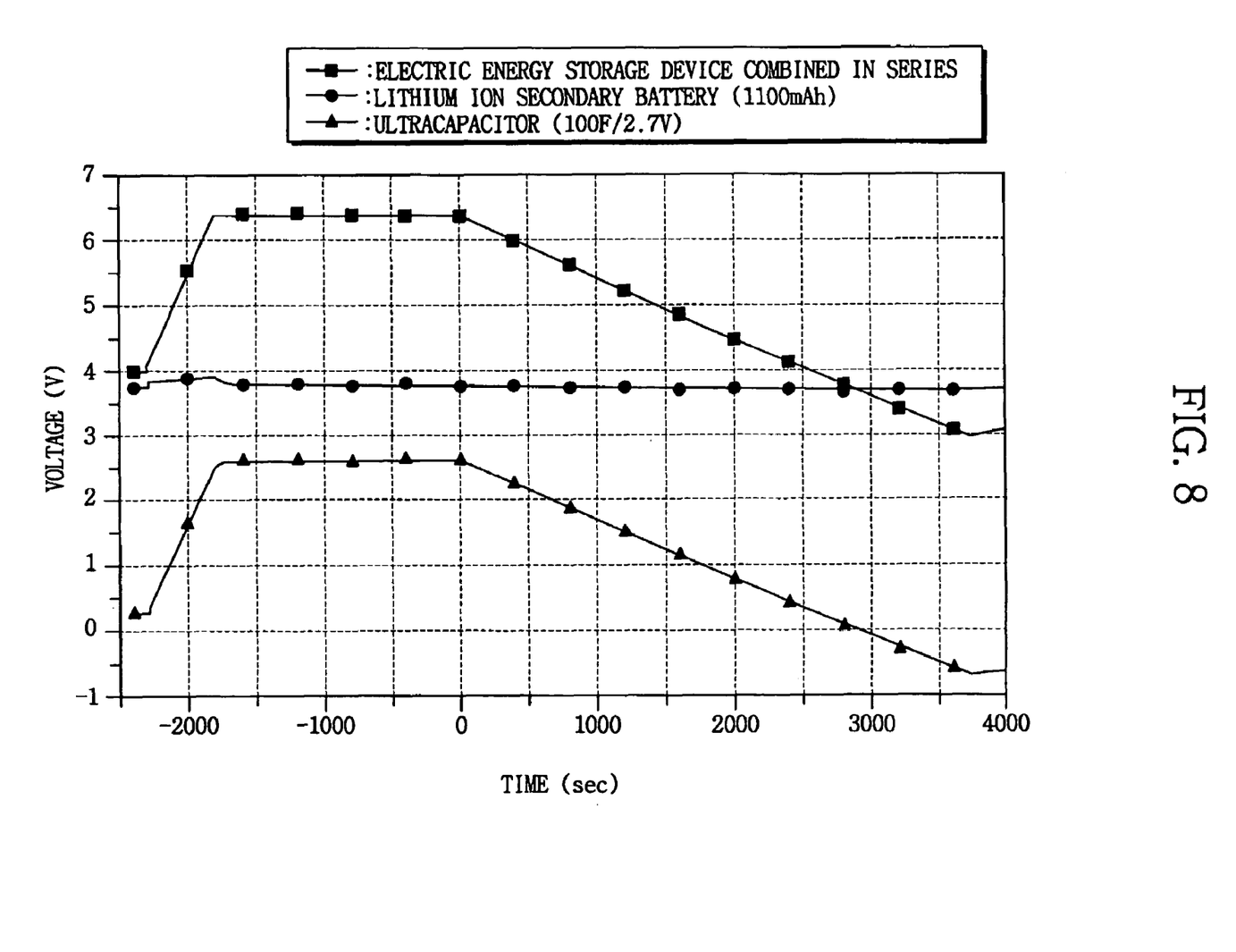
FIG. 8 is a graph illustrating a charging/discharging characteristic of an electric energy storage device according to a preferred embodiment of the present invention.

Referring to FIG. 8, the charging/discharging characteristic of the power module exhibited the capacitor characteristic. When the power module was charged to 6.4V, the voltage of the ultracapacitor was 2.627V and when the power module was discharged to 3.0V, the voltage of the ultracapacitor was −0.666V.

At this time, the voltage window of the electric double layer capacitor was 3.293V. This voltage window was an increased value when considering the maximum voltage window of 2.7V of the electric double layer capacitor.

The maximum voltage of the electric energy storage device obtained by connecting the lithium ion secondary battery and the ultracapacitor (100F/2.7V) in series, was 6.9V, which was the sum of the maximum voltage 4.2V of the lithium ion battery and the maximum voltage 2.7V of the ultracapacitor.

Since the total weight of the power module obtained by connecting the lithium ion battery (1110 mAh) and the ultracapacitor (100F/2.7V) in series and used in the present experiment was 53 g, the energy density of the power module (110.2F) used in this experiment reached 13.75 Wh/kg. When considering the energy density of the best product among the commercially available ultracapacitor is 6.0 wh/kg, the energy density can be increased by the above-described method.

According to the present invention, the cycle lifetime and the temperature characteristic of the electric energy storage device can be improved by enlarging the charging/discharging depth of the electric energy storage device having a good cycle lifetime, by reducing the charging/discharging depth of the electric energy storage device having a large capacitance and an inferior cycle lifetime, and by using the electric energy storage device having a large capacitance as a voltage buffer. Therefore, an electric energy storage device having a prolonged lifetime and exhibiting a smooth operation of the system irrespective of the temperature can be manufactured. In addition, an economic electric energy storage device considering the capacity and the energy can be provided. Further, the cost for keeping and repairing can be largely reduced when the energy storage device is applied as a power out in the fields including in the mountain and at the sea. Also, a stable provision of the power is possible.

While the present invention is described in detail referring to the attached embodiments, various modifications, alternate constructions and equivalents may be employed without departing from the true spirit and scope of the present invention.

The invention claimed is:

1. An electric energy storage device comprising a capacitor and a secondary battery combined in series; and
    an over-voltage preventing device connected to both end portions of the capacitor,
    wherein an electric capacity of the secondary battery is about four (4) to 100 times of an electric capacity of the capacitor, and
    wherein the over-voltage preventing device is an over-voltage preventing circuit comprising a voltage comparator for comparing a predetermined voltage and an applied voltage, a switch for flowing electricity when the applied voltage exceeds the predetermined voltage and a breeder resistor for discharging the capacitor when the switch flows the electricity.

2. The electric energy storage device as claimed in claim 1, wherein the secondary battery is one of a lead acid battery, a nickel-cadmium (Ni—Cd) battery, a nickel-metal hydride battery and a lithium ion battery, and the capacitor is one of an electric double layer capacitor, a metal oxide pseudo capacitor and a hybrid capacitor.

3. The electric energy storage device as claimed in claim 1, wherein the over-voltage preventing device is a Zener diode.

4. The electric energy storage device as claimed in claim 1, wherein the over-voltage preventing device is a shunt regulator.

5. The electric energy storage device as claimed in claim 1, further comprising an over-discharge preventing device connected to both end portions of the secondary battery.

6. A method of charging and discharging of an electric energy storage device comprising a capacitor and a secondary battery connected to the capacitor in series, and an over-voltage preventing device connected to both end portions of the capacitor, the method comprising:

charging the electric energy storage device to a sum of an operating voltage of the capacitor and a nominal voltage of the secondary battery; and discharging the capacitor to 0V or less, wherein an electric capacity of the secondary battery is about four (4) to 100 times of an electric capacity of the capacitor, and wherein the over-voltage preventing device is an over-voltage preventing circuit including a voltage comparator for comparing a predetermined voltage and an applied voltage, a switch for flowing electricity when the applied voltage exceeds the predetermined voltage and a breeder resistor for discharging the capacitor when the switch flows the electricity.

7. The method of charging and discharging of an electric energy storage device as claimed in claim 6, wherein the capacitor is an electric double layer capacitor and the secondary battery is one of a lead acid battery, a nickel-cadmium (Ni—Cd) battery, a nickel-metal hydride battery and a lithium ion battery.

8. The method of charging and discharging of an electric energy storage device as claimed in claim 6, wherein the over-voltage preventing device is a Zener diode.

9. The method of charging and discharging of an electric energy storage device as claimed in claim 6, wherein the over-voltage preventing device is a shunt regulator.

10. The method of charging and discharging of an electric energy storage device as claimed in claim 6, further comprising an over-discharge preventing device connected to both end portions of the secondary battery.

* * * * *